United States Patent
Huang et al.

(10) Patent No.: US 12,473,483 B1
(45) Date of Patent: Nov. 18, 2025

(54) LOW-MOLECULAR-WEIGHT COMPOSITE CONTAMINATION-RESISTANT ADDITIVE FOR WELL CEMENTING

(71) Applicant: Southwest Petroleum University, Chengdu (CN)

(72) Inventors: Sheng Huang, Chengdu (CN); Yuan Gao, Chengdu (CN); Zaoyuan Li, Chengdu (CN); Donghua Su, Chengdu (CN); Baowen Zhang, Chengdu (CN); Can Zhou, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 19/251,652

(22) Filed: Jun. 26, 2025

(30) Foreign Application Priority Data

Mar. 26, 2025 (CN) .......................... 202510363693.9

(51) Int. Cl.
*C08F 230/02* (2006.01)
*C04B 24/24* (2006.01)
(Continued)

(52) U.S. Cl.
CPC ............ *C09K 8/467* (2013.01); *C04B 24/243* (2013.01); *C04B 28/26* (2013.01);
(Continued)

(58) Field of Classification Search
None
See application file for complete search history.

(56) References Cited

U.S. PATENT DOCUMENTS 4,743,666 A * 5/1988 Engelhardt ........... D06P 1/5257
526/278
5,336,316 A 8/1994 Dawson

FOREIGN PATENT DOCUMENTS

CN 102899006 A 1/2013
CN 109097012 A 12/2018
(Continued)

OTHER PUBLICATIONS

Liu Xin, Synthesis and properties of phosphine-containing polymer retarder OPR-1 for oil and gas well cement, Petroleum Drilling Technology, vol. 42, No. 6,Jun. 30, 2020, pp. 714-719.
(Continued)

*Primary Examiner* — Richard A. Huhn
(74) *Attorney, Agent, or Firm* — Birchwood IP

(57) ABSTRACT

Disclosed is a low-molecular-weight composite contamination-resistant additive for well cementing, which includes: 60-85 parts by mass of low-molecular-weight phosphonic acid polymer solution and 15-40 parts by mass of silicate solution. The silicate solution is a low-modulus silicate solution with a mass fraction of 25%-45%, and the low-molecular-weight phosphonic acid polymer solution is a polymer solution with a mass fraction of 35%-60% and prepared from a phosphonic acid group-containing monomer, a rigid group-containing monomer and a carboxylic acid group-containing monomer. The present invention can form stable slurry after being added with drilling fluid, which meets the contamination-resistant requirements under low addition conditions and significantly reduces an amount of spacer fluid used. Compared with the retarder-type contamination-resistant additive that uses the retarding effect to prolong the thickening time, the present invention has a significant effect on abnormal gelation and reducing the consistency of mixed slurry.

6 Claims, 6 Drawing Sheets

(51) Int. Cl.
*C04B 28/26* (2006.01)
*C08F 220/58* (2006.01)
*C08F 226/10* (2006.01)
*C08K 3/34* (2006.01)
*C08L 33/24* (2006.01)
*C08L 43/02* (2006.01)
*C09K 8/467* (2006.01)

(52) U.S. Cl.
CPC ........ *C08F 220/585* (2020.02); *C08F 226/10* (2013.01); *C08F 230/02* (2013.01); *C08K 3/34* (2013.01); *C08L 33/24* (2013.01); *C08L 43/02* (2013.01); *C08F 220/58* (2013.01); *C08F 2800/20* (2013.01)

(56) References Cited

FOREIGN PATENT DOCUMENTS

| | | |
|---|---|---|
| CN | 109851710 A | 6/2019 |
| CN | 109852352 A | 6/2019 |
| CN | 117384326 A | 1/2024 |

OTHER PUBLICATIONS

Plank J,impact of the steric position of phosphonate groups in poly(N,N-dimethylarcyla mide-co-2-methylpropan esulfonate-co-2-x-phosphonate)on its adsorbed conformation on cement: comparison of vinylphosphonic acid, and 2- acrylamido-2-methylpr opanephosphonate modified terpolymers, «Journal of applied science» vol. 115. No. 3,Feb. 5, 2010, pp. 1758-1768.

* cited by examiner

LOW-MOLECULAR-WEIGHT COMPOSITE CONTAMINATION-RESISTANT ADDITIVE FOR WELL CEMENTING

CROSS-REFERENCE TO RELATED APPLICATIONS

This application claims priority to Chinese Patent Application No. 202510363693.9, filed on Mar. 26, 2025, which is hereby incorporated by reference in its entirety.

TECHNICAL FIELD

The present invention relates to the technical field of oilfield chemistry, and specifically to a low-molecular-weight composite contamination-resistant additive for well cementing.

BACKGROUND

With the deep exploration and development of oil and gas wells, the drilling operation faces various challenges such as high-temperature stability, reservoir protection, and shale hydration. At present, KCl/polysulfonate water-based drilling fluid becomes a more ideal choice in the water-based drilling fluid system for deep wells and ultra-deep wells due to the excellent performances of the KCl/polysulfonate water-based drilling fluid in high-temperature stability, anti-collapse inhibition, reservoir protection, and the like. The KCl/polysulfonate water-based drilling fluid, despite its numerous advantages, also presents a significant engineering challenge. After drilling operations are completed, cement slurry cementing, as an indispensable link in well completion, faces the challenge of poor chemical compatibility between the KCl/polysulfonate water-based drilling fluid and the cement slurry. This often leads to contact contamination, adversely affecting the quality of cementing construction. The well cementing construction is a systematic project with the characteristics of short construction time, high technicality, various unknown factors and high risks. The quality of well cementing not only directly affects whether the oil and gas well is successfully completed, but also concerns the service life and output of the oil and gas well. Therefore, it is necessary to ensure the integrity of the cement sheath to achieve well control safety, effective isolation and support of underground oil, gas and water layers, which is the core goal of well cementing operations.

However, in actual well cementing construction, the displacement efficiency of a spacer fluid and a flush fluid cannot reach 100%, resulting in inevitable contact contamination between the cement slurry and residual drilling mud. Such contamination, potentially triggered by drilling fluid incompatibility and other factors, may complicate the cement placement process and ultimately lead to cementing operation failure. The contamination manifests as cement slurry defects including abnormal gelation, and abnormally shortened thickening time. In severe cases, the contamination may lead to incidents such as casing blockage, annular bridging, or stuck pipe/tubing after cementing, which are commonly referred to as the sausage casing and flagpole cementing. These problems not only increase the difficulty and risk of construction, but may also have an adverse impact on the long-term stability and production efficiency of oil and gas wells. Therefore, how to effectively solve the contamination of the drilling fluid on cement slurry in the well cementing process and improve the integrity of the cement sheath and the well cementing quality becomes a key technical problem to be solved urgently in the current oil and gas well development.

The mechanisms of the contamination are mainly as follows:

(1) There are a large number of strongly adsorbing groups in the macromolecular polymers of drilling fluid treatment agents, such as carboxyl (—COOH), sulfonic acid (—SO3H) and amide (—CONH2). These strongly adsorbing groups undergo deprotonation reaction under the strong alkaline conditions of cement slurry, resulting in very strong adsorption of these groups. Meanwhile, since the cement slurry system produces more metal ions during the hydration process and more active sites are exposed on the surface of cement particles, after the cement slurry system is mixed with the drilling fluid, the active strong-adsorbing groups in the polymer components of the drilling fluid undergo adsorption reactions with the metal ions and cement particles, and a gel structure is generated between ions and particles, which eventually leads to a serious decrease in the fluidity of the mixed slurry.

(2) The polymer molecules have strong adsorption capacity and form water-insoluble precipitates by chelating with Ca2+, which reduces Ca2+ concentration in the solution and cannot meet the hydration requirements, thereby reducing the cement hydration process.

(3) When exposed to a high temperature of about 120° C., the sulfonated material treatment agent in the drilling fluid hydrolyzes to form a large number of carboxyl groups, the carboxyl groups bridge with high-valent metal ions to form a network structure, and the consistency of the system increases significantly. With the massive hydrolysis of sulfonic acid groups, the consistency further increases, and abnormal phenomena such as abnormal gelation appear in the cement slurry.

At present, the most commonly used method is to increase the amount of spacer fluid and add a high amount of retarder or other acidic substances to the spacer fluid to prolong the thickening time of the cement slurry contaminated by the drilling fluid. However, this method does not fundamentally solve the contamination. In well cementing operations, and still faces the problem of contact contamination between cement slurry and drilling fluid. In addition, the use of large amounts of spacer fluid and retarder means increases costs, which runs counter to the current environment of cost reduction and efficiency improvement. Therefore, it is necessary to develop an efficient and convenient contamination-resistant additive.

SUMMARY

In view of this, the present invention provides a low-molecular-weight composite contamination-resistant additive for well cementing, which may effectively reduce the contamination of the existing potassium polysulfonated water-based drilling fluid to cement slurry, improve the stability and fluidity of the mixed slurry, inhibit the phenomena of With the massive hydrolysis of sulfonic acid groups, the consistency further increases, phenomena such as abnormal gelation appear in the cement slurry.

and significantly improve the sedimentation stability of the water-based drilling fluid, while not causing negative impact on the hydration of cement slurry.

The present invention discloses a low-molecular-weight composite contamination-resistant additive for well cementing, which includes:

60-85 parts by mass of low-molecular-weight phosphonic acid polymer solution 15-40 parts by mass of silicate solution;

a preparation method of the low-molecular-weight composite contamination-resistant additive for well cementing includes: uniformly stirring the low-molecular-weight phosphonic acid polymer solution and the silicate solution at a temperature of not higher than 40° C. at a speed of 200-400 r/min.

In one embodiment of the present invention, silicate in the silicate solution is at least one of sodium silicate and potassium silicate, and the silicate has a modulus of 1.2 to 2.5.

In one embodiment of the present invention, a preparation method of the silicate solution includes the following steps: uniformly stirring silicate powder in deionized water at a temperature of 40-70° C. at a speed of 300-500 r/min for at least 2 h, and preparing to obtain the silicate solution with a mass fraction of 25%-45%.

In one embodiment of the present invention, a preparation method of the low-molecular-weight phosphonic acid polymer solution includes the following steps: uniformly stirring low-molecular-weight phosphonic acid polymer powder in deionized water at room temperature at a speed of 300-500 r/min for at least 2 h, and preparing to obtain the low-molecular-weight phosphonic acid polymer solution with a mass fraction of 35%-60%.

In one embodiment of the present invention, a preparation method of low-molecular-weight phosphonic acid polymer in the low-molecular-weight phosphonic acid polymer solution includes the following steps:

Step S1: mixing and dissolving a phosphonic acid group-containing monomer, a rigid group-containing monomer and a carboxylic acid group-containing monomer in a molar ratio of 4-7:2-4:1-3 in deionized water to obtain a monomer solution with a mass fraction of 20%-50%;

Step S2: adding a chain transfer agent accounting for 3%-20% of a total mass of the monomers into the monomer solution, stirring and dissolving at a speed of 200-300 r/min, and heating to 45° C. under the protection of inert gas in the stirring process;

Step S3: dripping a solution of an initiator in deionized water in a concentration of 10%-20% into the monomer solution with stirring, and reacting for 3-8 h at 50-70° C. after dripping within 30-50 min, where the initiator in the solution of the initiator in deionized water accounts for 0.05%-1.5% of a total mass of the monomers; and Step S4: distilling a reactant under reduced pressure at 30-80° C., cooling the reactant to room temperature, freezing, drying, and grinding into powder.

Further, the phosphonic acid group-containing monomer is one of vinylphosphonic acid, dimethyl-vinyl phosphonate, diethyl-vinyl phosphonate, and 2-acrylamide-2-methylpropane phosphonic acid.

Further, the rigid group-containing monomer is one of N-vinyl pyrrolidone and 4-acryloylmorpholine.

Further, the carboxylic acid group-containing monomer is one of acrylic acid, maleic acid, methacrylic acid, and itaconic acid.

Further, the chain transfer agent is one or a combination of mercaptoethanol, isopropanol, triethylamine, n-butanol, and sodium bisulfite.

Further, the initiator is one of ammonium persulfate, sodium persulfate, and potassium persulfate.

The contamination-resistant mechanism of the present invention may be seen in FIG. 6. Specifically, the low-molecular-weight phosphonic acid polymer has a large number of strongly adsorbing phosphonic acid groups, whose the adsorption strength is far greater than that of sulfonated treating agents in potassium polysulfonated water-based drilling fluid, the strongly adsorbing phosphonic acid groups shield metal ions and active sites in cement slurry, and inhibit the reaction between the drilling fluid treating agent and the cement slurry, so that an agglomerated gel structure is avoided. Since the polymers in the contamination-resistant additive are low-molecular-weight polymers with multiple adsorption sites, these polymers are largely adsorbed only on single cement particles or form multi-dentate chelates with metal ions, so that the possibility of cross-linking of the contamination-resistant additive between cement particles is reduced, and the problems of the generation of "abnormal gelation" in contaminated slurries, shortened thickening time and excessive initial consistency are inhibited. The rigid groups improve the temperature resistance and structural stability of the contamination-resistant additive at high temperatures. Meanwhile, silicate in the contamination-resistant additive reacts with $Ca2+$ in cement slurry to generate precipitate, which reduces the $Ca2+$ concentration in the solution, inhibits the reaction of a large number of adsorbing groups produced by the hydrolysis of sulfonic acid groups in the sulfonated material at the high temperatures of 100-130° C. with $Ca2+$, and inhibits the gelation-induced nodules of contaminated slurry, thereby achieving the purpose of contamination-resistance. Meanwhile, the hydration process of the cement slurry is promoted after the silicate reacts with $Ca2+$ to generate calcium silicate.

The present invention is added into the water-based drilling fluid, which may play a role in high-temperature suspension stability of the slurry. The working principle is as follows: low-molecular-weight phosphonic acid polymer is adsorbed on solid particles, and the carboxyl groups therein negatively charge the cement particles, thereby generating electrostatic repulsion between the solid particles and dispersing the solid particles.

The present invention has the technical effects as follows.

(1) The present invention can form a stable slurry after being added into the drilling fluid or cement slurry system, which meets the contamination-resistant requirements under low addition conditions and significantly reduces an amount of spacer fluid used.

(2) Compared with the traditional retarder-type contamination-resistant additive that uses the retarding effect to prolong the thickening time, the present invention also has a very significant effect on inhibiting the abnormal gelation and reducing the consistency of mixed slurry, where the thickening time exceeds the thickening time of uncontaminated cement slurry, and the initial consistency is less than 30 Bc.

(3) The present invention may be used for contamination control between conventional drilling fluids and cement slurries, as well as for well cementing operations in complex formations with high temperature, high pressure, and high salinity conditions.

(4) The present invention exhibits broad applicability, functioning not only as a contamination-resistant additive but also as a suspending agent in water-based drilling fluids. The drilling fluids treated with the present invention show significantly improved sedimentation stability after aging compared with drilling fluids without adding the contamination-resistant additive.

(5) The low-molecular-weight phosphonic acid polymer and the silicate in the present invention have synergistic effect, where the silicate promotes the hydration of cement, and after the cement slurry, the spacer fluid and the water-based drilling fluid are mixed, the strength development of the mixed slurry is much stronger than that of the drilling fluid without adding the contamination-resistant additive.

DESCRIPTION OF EMBODIMENTS

DESCRIPTION OF EMBODIMENTS

Figure 1:
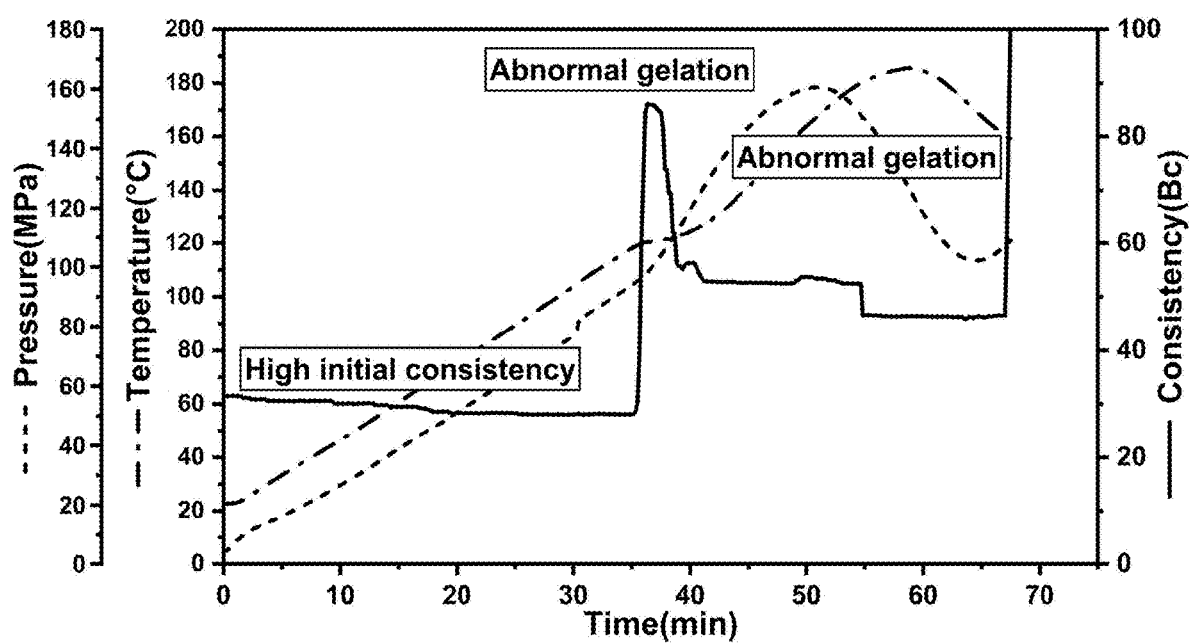
FIG. 1 is a graph showing a thickening experiment of a cement system represented by Group 2 in Table 1 according to the present invention.

The present invention is further described in detail below with reference to the examples; however, the examples of the present invention are not limited thereto. Unless otherwise stated, the experimental methods used in the following examples are conventional methods. The materials, reagents, and the like used in the following examples can be commercially available unless otherwise stated.

Example 1

1. Preparation of Low-Molecular-Weight Phosphonic Acid Polymer
   (1) Vinylphosphonic acid, N-vinyl pyrrolidone and itaconic acid were mixed in a molar ratio of 5:3:2 and dissolved in deionized water to prepare a monomer solution with a mass fraction of 20%.
   (2) An isopropanol chain transfer agent accounting for 20% of a total weight of monomers was dissolved in the monomer solution and put into a reaction kettle for stirring and heating to 45° C. The stirring speed was controlled at 300 r/min, and inert gas nitrogen was introduced as a protective gas during the heating process.
   (3) An ammonium persulfate initiator accounting for 1% of a total weight of monomers was prepared into a solution of the initiator in deionized water in a mass concentration of 10%, and then dropped into the monomer solution and stirred evenly. The solution of the initiator in deionized water was controlled to be dropped completely within 30 min, and then the reaction was performed at 55° C. for 8 h.
   (4) The chain transfer agent in the polymer solution was removed by distilling under reduced pressure, with the heating temperature strictly controlled at 40° C.±5° C., until an outflow rate of a distillate was significantly slowed down and stopped, and then cooled to room temperature, freeze-dried, and ground into powder to obtain solid low-molecular-weight phosphonic acid-based polymer powder. The number average molecular weight of the polymer was 7310 as determined by gel permeation chromatography (GPC).

2. Preparation of Low-Molecular-Weight Phosphonic Acid Polymer Solution

The obtained solid low-molecular-weight phosphonic acid-based polymer powder was dissolved in deionized water under stirring at room temperature. The stirring speed was controlled at 300 r/min, and the stirring was performed for 2 h to prepare the low-molecular-weight phosphonic acid polymer solution with a mass fraction of 50%.

3. Preparation of Silicate Solution

Low-modulus sodium silicate powder with a modulus of 2.00 was stirred and dissolved in deionized water at 45° C. The stirring speed was controlled at 400 r/min and stirred for 2 h to prepare the silicate solution with a mass fraction of 30%.

4. Preparation of Contamination-Resistant Additive

The low-molecular-weight phosphonic acid polymer solution and the silicate solution prepared above were uniformly stirred in a mass ratio of 70:30 at a speed of 200-400 r/min at 40° C.

Example 2

1. Preparation of Low-Molecular-Weight Phosphonic Acid Polymer
   (1) Dimethyl-vinyl phosphonate, N-vinyl pyrrolidone and methacrylic acid were mixed in a molar ratio of 4:4:2 and dissolved in deionized water to prepare a monomer solution with a mass fraction of 20%.
   (2) A mercaptoethanol chain transfer agent accounting for 15% of a total weight of monomers was dissolved in the monomer solution and put into a reaction kettle for stirring and heating to 45° C. The stirring speed was controlled at 200 r/min, and inert gas helium was introduced as a protective gas during the heating process.
   (3) A potassium persulfate initiator accounting for 1.5% of a total weight of monomers was prepared into a solution of the initiator in deionized water in a mass concentration of 15%, and then dropped into the monomer solution and stirred evenly. The solution of the initiator in deionized water was controlled to be dropped completely within 40 min, and then the reaction was performed at 60° C. for 6 h.
   (4) The chain transfer agent in the polymer solution was removed by distilling under reduced pressure, with the heating temperature strictly controlled at 55° C.±5° C., until an outflow rate of a distillate was significantly slowed down and stopped, and then cooled to room temperature, freeze-dried, and ground into powder to obtain solid low-molecular-weight phosphonic acid-based polymer powder. The number average molecular weight of the polymer was 7284 as determined by gel permeation chromatography (GPC).

2. Preparation of Low-Molecular-Weight Phosphonic Acid Polymer Solution

The obtained solid low-molecular-weight phosphonic acid-based polymer powder was dissolved in deionized water under stirring at room temperature. The stirring speed was controlled at 300 r/min, and the stirring was performed for 2 h to prepare the low-molecular-weight phosphonic acid polymer solution with a mass fraction of 35%.

3. Preparation of Silicate Solution

Low-modulus sodium silicate powder with a modulus of 2.30 was stirred and dissolved in deionized water at 65° C. The stirring speed was controlled at 500 r/min and stirred for 2 h to prepare the silicate solution with a mass fraction of 35%.

4. Preparation of Contamination-Resistant Additive

The low-molecular-weight phosphonic acid polymer solution and the silicate solution prepared above were uniformly stirred in a mass ratio of 80:20 at a speed of 200-400 r/min at 40° C.

Example 3

1. Preparation of Low-Molecular-Weight Phosphonic Acid Polymer
   (1) 2-acrylamide-2-methylpropane phosphonic acid, 4-acryloylmorpholine and maleic acid were mixed in a molar ratio of 6:2:2 and dissolved in deionized water to prepare a monomer solution with a mass fraction of 25%.
   (2) A mercaptoethanol chain transfer agent accounting for 10% of a total weight of monomers was dissolved in the monomer solution and put into a reaction kettle for stirring and heating to 45° C. The stirring speed was controlled at 250 r/min, and inert gas helium was introduced as a protective gas during the heating process.
   (3) A potassium persulfate initiator accounting for 0.5% of a total weight of monomers was prepared into a solution of the initiator in deionized water in a mass concentration of 10%, and then dropped into the monomer solution and stirred evenly. The solution of the initiator in deionized water was controlled to be dropped completely within 50 min, and then the reaction was performed at 55° C. for 7 h.
   (4) The chain transfer agent in the polymer solution was removed by distilling under reduced pressure, with the heating temperature strictly controlled at 50° C.±5° C., until an outflow rate of a distillate was significantly slowed down and stopped, and then cooled to room temperature, freeze-dried, and ground into powder to obtain solid low-molecular-weight phosphonic acid-based polymer powder. The number average molecular weight of the polymer was 2836 as determined by gel permeation chromatography (GPC).
2. Preparation of Low-Molecular-Weight Phosphonic Acid Polymer Solution The obtained solid low-molecular-weight phosphonic acid-based polymer powder was dissolved in deionized water under stirring at room temperature. The stirring speed was controlled at 300 r/min, and the stirring was performed for 2 h to prepare the low-molecular-weight phosphonic acid polymer solution with a mass fraction of 40%.

3. Preparation of Silicate Solution

Low-modulus sodium silicate powder with a modulus of 2.35 was stirred and dissolved in deionized water at 60° C. The stirring speed was controlled at 400 r/min and stirred for 2 h to prepare the silicate solution with a mass fraction of 30%.

4. Preparation of Contamination-Resistant Additive

The low-molecular-weight phosphonic acid polymer solution and the silicate solution prepared above were uniformly stirred in a mass ratio of 85:15 at a speed of 200-400 r/min at 40° C.

Example 4

1. Preparation of Low-Molecular-Weight Phosphonic Acid Polymer
   (1) Diethyl-vinyl phosphonate, 4-acryloylmorpholine and acrylic acid were mixed in a molar ratio of 6.5:2.5:1 and dissolved in deionized water to prepare a monomer solution with a mass fraction of 30%.
   (2) A triethylamine chain transfer agent accounting for 15% of a total weight of monomers was dissolved in the monomer solution and put into a reaction kettle for stirring and heating to 45° C. The stirring speed was controlled at 300 r/min, and inert gas helium was introduced as a protective gas during the heating process.
   (3) An ammonium persulfate initiator accounting for 1% of a total weight of monomers was prepared into a solution of the initiator in deionized water in a mass concentration of 15%, and then dropped into the monomer solution and stirred evenly. The solution of the initiator in deionized water was controlled to be dropped completely within 30 min, and then the reaction was performed at 65° C. for 4 h.
   (4) The chain transfer agent in the polymer solution was removed by distilling under reduced pressure, with the heating temperature strictly controlled at 45° C.±5° C., until an outflow rate of a distillate was significantly slowed down and stopped, and then cooled to room temperature, freeze-dried, and ground into powder to obtain solid low-molecular-weight phosphonic acid-based polymer powder. The number average molecular weight of the polymer was 8434 as determined by gel permeation chromatography (GPC).
2. Preparation of Low-Molecular-Weight Phosphonic Acid Polymer Solution The obtained solid low-molecular-weight phosphonic acid-based polymer powder was dissolved in deionized water under stirring at room temperature. The stirring speed was controlled at 300 r/min, and the stirring was performed for 2 h to prepare the low-molecular-weight phosphonic acid polymer solution with a mass fraction of 40%.

3. Preparation of Silicate Solution

Low-modulus sodium silicate powder with a modulus of 2.50 was stirred and dissolved in deionized water at 70° C. The stirring speed was controlled at 450 r/min and stirred for 2 h to prepare the silicate solution with a mass fraction of 30%.

4. Preparation of Contamination-Resistant Additive

The low-molecular-weight phosphonic acid polymer solution and the silicate solution prepared above were uniformly stirred in a mass ratio of 60:40 at a speed of 200-400 r/min at 40° C.

Comparative Example 1

The raw material amount and implementation method of Comparative Example 1 are basically the same as those of Example 1, except that no chain transfer agent is added in Comparative Example 1, and the obtained phosphonic acid-based polymer has a molecular weight of 110991.

Comparative Example 2

The difference between Comparative Example 2 and Example 1 is that, in Comparative Example 2, no silicate solution is prepared, the contamination-resistant additive is only composed of low-molecular-weight phosphonic acid-based polymer solution, and the amounts of other raw materials and the implementation method are the same.

Comparative Example 3

The difference between Comparative Example 3 and Example 1 is that, in Comparative Example 3, no low-molecular-weight phosphonic acid-based polymer solution is prepared, the contamination-resistant additive is only composed of silicate solution, and the amounts of other raw materials and the implementation method are the same.

Comparative Example 4

Comparative Example 4 is a commercial retarder BCR-300L.

contamination-resistant additive was added to the drilling fluid, stirred for 24 h, and after being fully dissolved, aged at 200° C. for 16 h to obtain the drilling fluid with the contamination-resistant additive added for standby use. Then, cement slurry was prepared according to the cement slurry preparation method specified in GB19139-2012 "Test Methods for Oil Well Cement". The cement slurry, drilling fluid, and spacer fluid were mixed according to specific volume percentages, and blank groups 1 to 3 without adding contamination-resistant additives were set as controls according to the standard. The fluidity, thickening time, and compressive strength of the mixed slurry were tested according to GB19139-2012 "Test Methods for Oil Well Cement". The thickening test was performed according to the actual working conditions of an oil field in Xinjiang at 164° C.×120 MPa×90 min, and the compressive strength test curing conditions were 149° C.×20.7 MPa×48 h. The specific results are shown in Table 1:

TABLE 1

Evaluation results of contamination-resistant performance

| Groups | Groups with contamination-resistant additives added | Cement slurry % | Drilling fluid % | Spacer fluid % | Amount of contamination-resistant additive wt % | Fluidity/ cm | Thickening time (min)/ Initial consistency (Bc) | Compressive strength/ MPa (48 h) | Notes |
|---|---|---|---|---|---|---|---|---|---|
| 1 | Blank group 1 | 100 | 0 | 0 | 0 | 22 | 433/18 | 26.3 | |
| 2 | Blank group 2 | 70 | 30 | 0 | 0 | 16 | 68/35 | 0 | Encapsulated mud core, gelation-induced nodule and thickening |
| 3 | Blank group 3 | 70 | 20 | 10 | 0 | 18 | 127/24 | 8.2 | Encapsulated mud core and gelation-induced nodule |
| 4 | Example 1 | 70 | 30 | 0 | 1.5 | 21 | 465/21 | 14.7 | |
| 5 | Example 1 | 70 | 20 | 10 | 1.5 | 22 | 428/19 | 16.1 | |
| 6 | Example 2 | 70 | 30 | 0 | 1.5 | 22 | 423/25 | 14.4 | |
| 7 | Example 2 | 70 | 20 | 10 | 1.5 | 22 | 408/23 | 17.5 | |
| 8 | Example 3 | 70 | 30 | 0 | 1 | 21 | 495/21 | 15.3 | |
| 9 | Example 3 | 70 | 20 | 10 | 1 | 23 | 471/24 | 19.8 | |
| 10 | Example 4 | 70 | 30 | 0 | 1.5 | 22 | 430/21 | 14.2 | |
| 11 | Example 4 | 70 | 20 | 10 | 1.5 | 23 | 401/24 | 16.9 | |
| 12 | Comparative Example 1 | 70 | 30 | 0 | 1.5 | 17 | 327/34 | 11.5 | Encapsulated mud core and thickening |
| 13 | Comparative Example 1 | 70 | 20 | 10 | 1.5 | 20 | 342/28 | 17.5 | Encapsulated mud core and thickening |
| 14 | Comparative Example 2 | 70 | 30 | 0 | 1.8 | 24 | 420/18 | 9.4 | Gelation-induced nodule |
| 15 | Comparative Example 2 | 70 | 20 | 10 | 1.8 | 25 | 404/16 | 12.6 | Gelation-induced nodule |
| 16 | Comparative Example 3 | 70 | 30 | 0 | 1.5 | 18 | 269/18 | 18.8 | Encapsulated mud core |
| 17 | Comparative Example 3 | 70 | 20 | 10 | 1.5 | 20 | 258/15 | 23.1 | Encapsulated mud core |
| 20 | Comparative Example 4 | 70 | 20 | 10 | 10 | 23 | 497/20 | 6.7 | |
| 21 | Comparative Example 4 | 70 | 10 | 20 | 10 | 23 | 592/18 | 2.5 | |

To better illustrate the technical effects of the present invention, corresponding characterization and performance evaluation are provided for relevant examples below.

1. Evaluation of Contamination-Resistant Performance

Drilling fluids added with the contamination-resistant additives in Examples and Comparative Examples were prepared for performance evaluation. The specific steps are as follows: 1 L of a drilling fluid strongly contaminating cement slurry was measured, a certain proportion of the As shown in Table 1, after the product of the present invention is added into the potassium polysulfonated water-based drilling fluid, the compatibility of cement slurry and drilling fluid is significantly improved, the fluidity and compressive strength of the slurry are improved, the thickening time is prolonged, and the problems of abnormal gelation of the slurry are effectively inhibited.

FIG. 1 shows a cement system of cement slurry and drilling fluid in a ratio of 7:3 of Group 2 in Table 1, and FIG.

Figure 2:
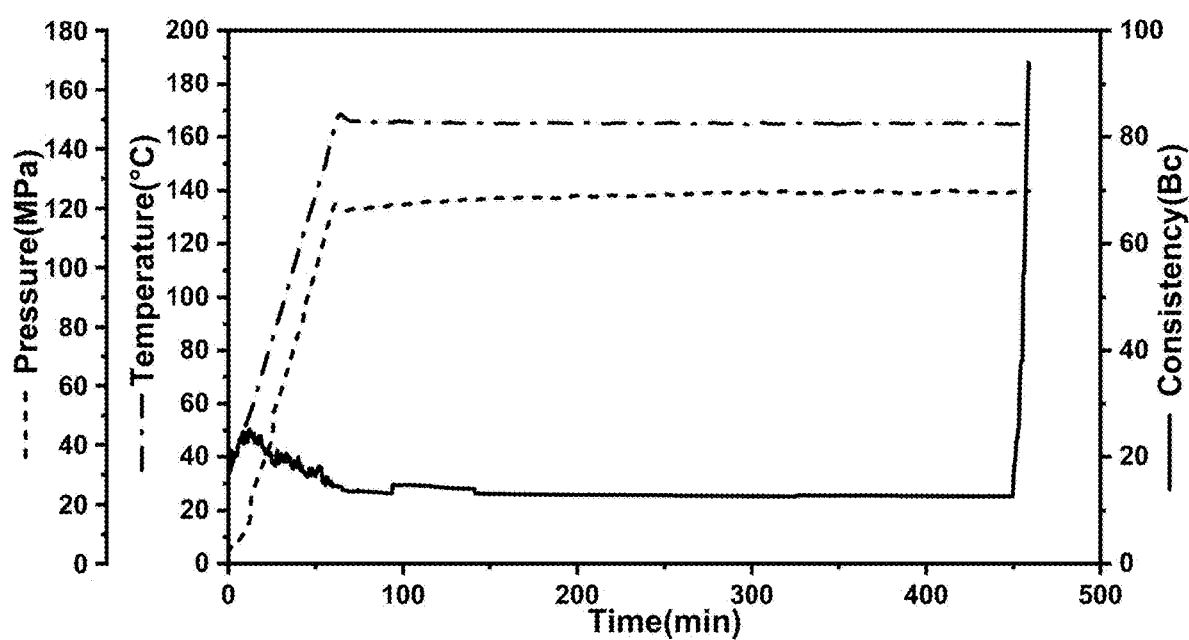
FIG. 2 is a graph showing a thickening experiment of a cement system represented by Group 8 in Table 1 according to the present invention.
Figure 3:
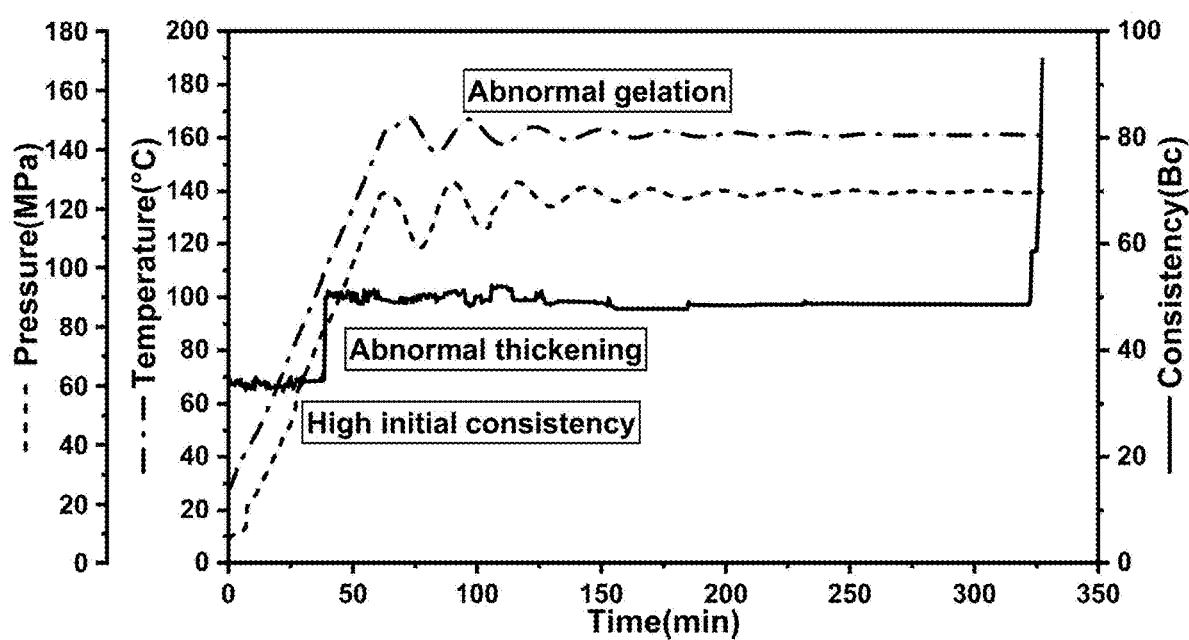
FIG. 3 is a graph showing a thickening experiment of a cement system represented by Group 12 in Table 1 according to the present invention.

2 shows a cement system of cement slurry and drilling fluid in a ratio of 7:3 of Group 8 in Table 1. By comparing FIGS. 1 and 2, it may be found that the system of Group 2 without adding the contamination-resistant additive has a thickening time of only 68 min, and is accompanied by problems such as abnormal gelation. Group 12 in Table 1 is a mixed cement system in which the cement slurry with the higher-molecular-weight polymer-silicate composite contamination-resistant additive in Comparative Example 1 and the drilling fluid are added in a ratio of 7:3. The results are shown in FIG. 3, and it may be seen that the abnormal gelation are not effectively inhibited. The initial consistency of the mixed slurry exceeds 35 Bc, abnormal thickening occurs after the temperature is increased to be close to 120° C., the consistency increases to be close to 50 Bc, which is probably because the molecular weight of a large strong absorbing polymer forms a strong cross-linking structure between cement particles and promotes the thickening of the mixed slurry together with a polymer treating agent in the drilling fluid. This proves that the control of the molecular weight of the contamination-resistant additive is one of key factors for ensuring the normal effect of the contamination-resistant additive in a cement system.

Figure 4:
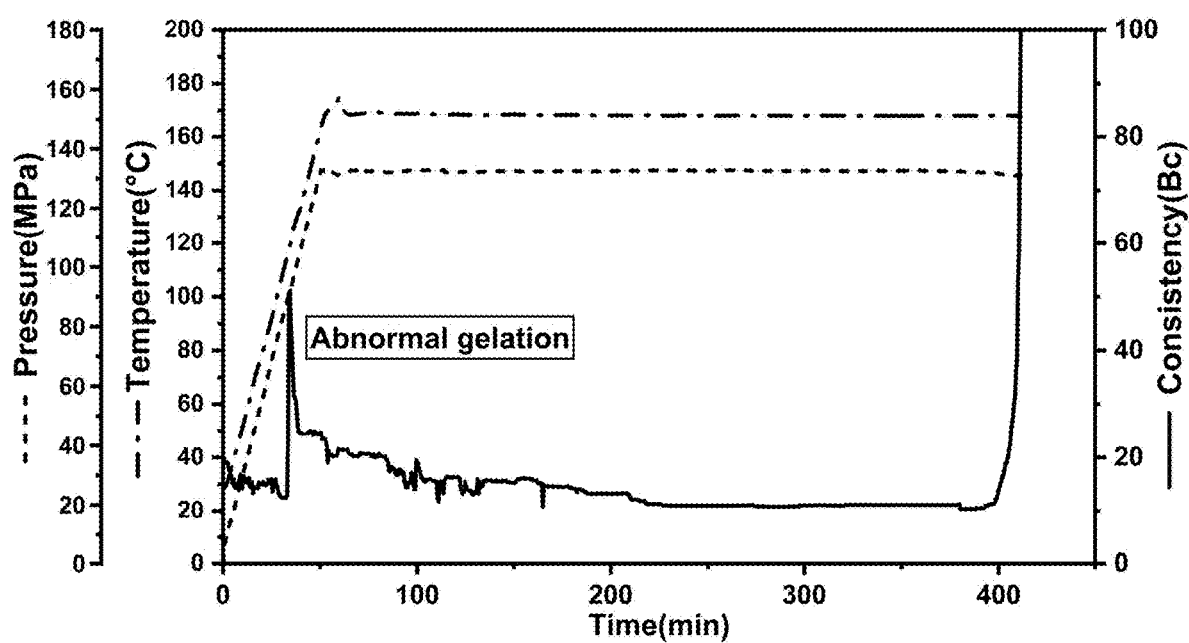
FIG. 4 is a graph showing a thickening experiment of a cement system represented by Group 14 in Table 1 according to the present invention.
Figure 5:
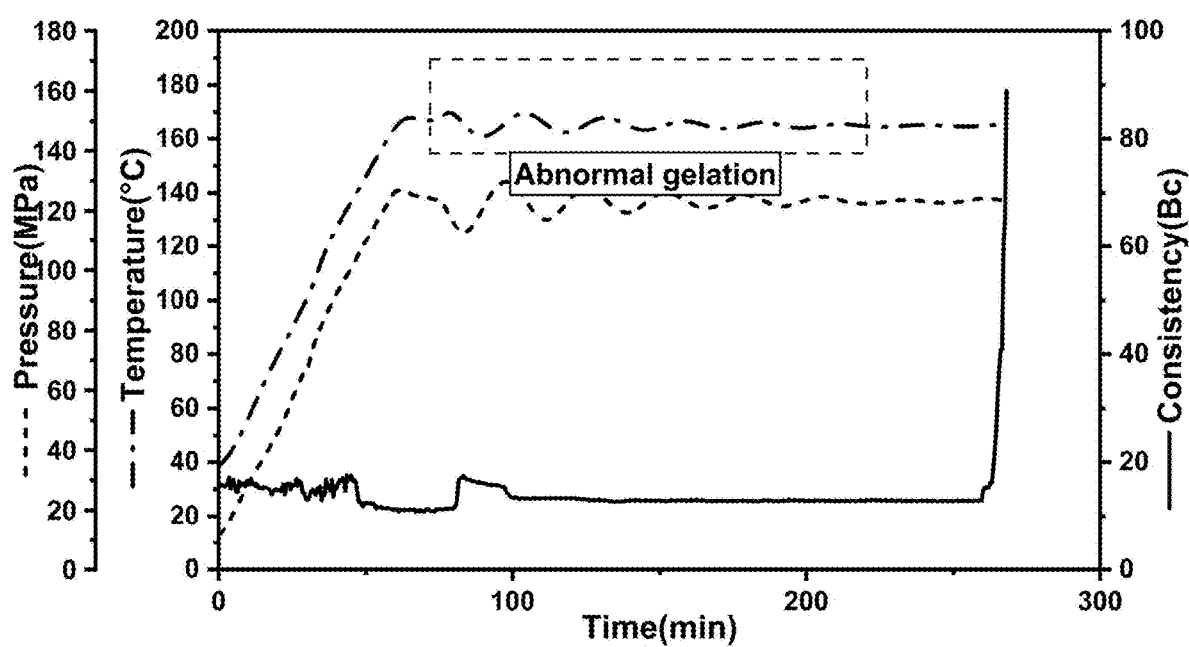
FIG. 5 is a graph showing a thickening experiment of a cement system represented by Group 16 in Table 1 according to the present invention.
Figure 6:
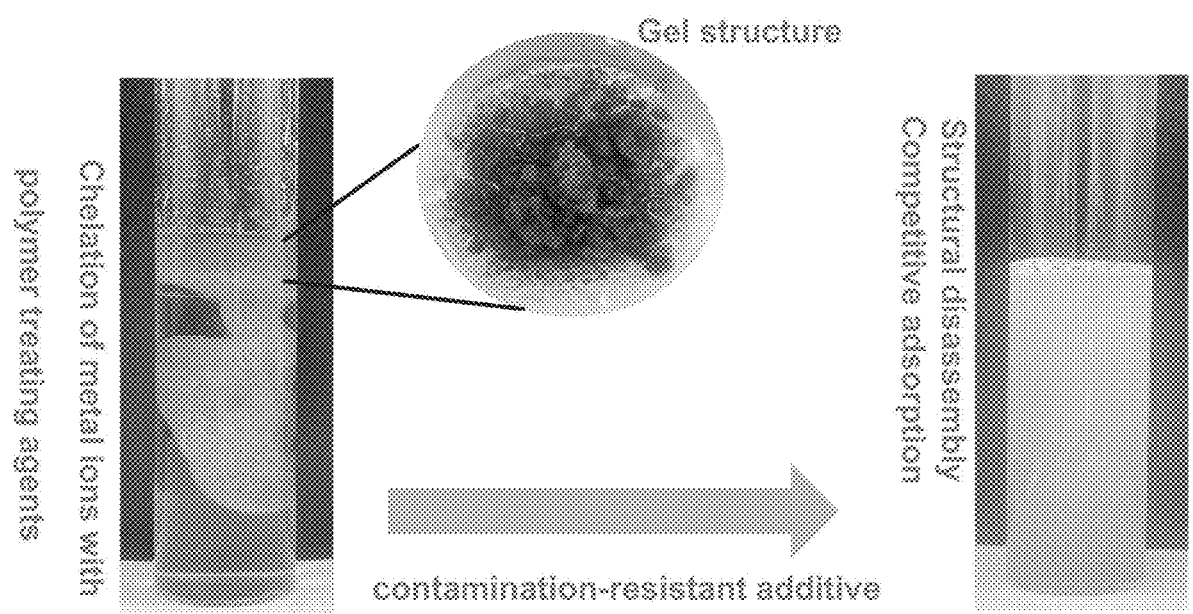
FIG. 6 is a schematic diagram of a contamination-resistant principle according to the present invention.

The results of the thickening experiment for group 14 in Table 1 are shown in FIG. 4. It may be seen from FIG. 4 that the gelation-induced nodules cannot be effectively inhibited by adding the contamination-resistant additive consisting of single low-molecular-weight phosphonic acid-based polymer in Comparative Example 2 into a mixed cement system in which cement slurry and drilling fluid are mixed in a ratio of 7:3. When the contamination-resistant additive consisting of single silicate in Comparative Example 3 was added to a system in which the cement slurry and the drilling fluid were mixed in a ratio of 7:3 according to the ratio of group 16 in Table 1, the results are shown in FIG. 5, and the problems of abnormal gelation and shortening of thickening time also occur. Meanwhile, combined with the performance of the commercial contamination-resistant additive BCR-300L in the system in Comparative Example 4, even when the thickening time requirement is met and the amount added reaches 10 wt %, the compressive strength of the mixed slurry after curing still shows extremely low characteristics. It may be seen that the contamination-resistant additive according to the present invention can show better comprehensive performance on the premise that the addition amount of the contamination-resistant additive is far less than that of the retarder in the Comparative Example 4. This is mainly because the low-molecular-weight phosphonic acid polymer-silicate has a synergistic effect and competes with the drilling fluid treating agent for adsorption, the concentration of metal ions in cement slurry in a contacted mixed slurry solution may be effectively reduced, active sites of cement particles are shielded, the contamination of the strongly adsorbing treating agent to the cement slurry is inhibited, and the contamination-resistant purpose is achieved. Due to the existence of silicate, the normal hydration reaction of the cement slurry is not negatively affected on the premise of achieving contamination resistance, and the hydration degree of the contaminated cement slurry is promoted.

2. Suspension Performance Evaluation

The drilling fluid stability test was performed at 2.20 g/cm3 according to the Chinese National Standard GB/T 16783.1-2014 testing methodology. The amount of the contamination-resistant additive added was 1.5 wt % of the total volume of drilling fluid. The drilling fluid was stirred and sealed for 24 h, and then placed in a high-temperature aging tank after being stirred for 20 min. Then the drilling fluid was hot-rolled and aged at 200° C. for 16 h, stirred for 20 min and left to stand for 4 h. The density difference between the upper and lower suspensions was measured, and a blank group 4 without adding the contamination-resistant additive was set as a control. The test results are shown in Table 2:

TABLE 2

| Project | Evaluation results of suspension performance | | | | |
|---|---|---|---|---|---|
| | Blank group 4 | Example 1 | Example 2 | Example 3 | Example 4 |
| Upper density | 2.04 | 2.19 | 2.18 | 2.20 | 2.19 |
| Lower density | 2.28 | 2.20 | 2.20 | 2.20 | 2.21 |
| Density difference | 0.24 | 0.01 | 0.02 | 0.00 | 0.02 |

It may be seen from the results in Table 2 that the present invention added into the water-based drilling fluid still exhibits good sedimentation stability after being aged at a high temperature of 200° C. for 16 h, which proves that the present invention can effectively improve the chemical compatibility among cement slurry, spacer fluid and drilling fluid, reduce the risks such as weighting agent sedimentation, annular blockage and pump overpressure during well cementing operations, and ensure both operational safety and cementing quality.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention. Therefore, the protection scope of the present invention shall be subject to the protection scope of the claims.

What is claimed is:

1. A composite additive for well cementing, comprising:
60-85 parts by mass of phosphonic acid polymer solution, 15-40 parts by mass of silicate solution;
wherein a preparation method of the composite additive for well cementing comprises: stirring the phosphonic acid polymer solution and the silicate solution at a temperature of not higher than 40° C. at a speed of 200-400 r/min;
a preparation method of phosphonic acid polymer in the phosphonic acid polymer solution comprises the following steps:
Step S1: mixing and dissolving a phosphonic acid group-containing monomer, a rigid group-containing monomer and a carboxylic acid group-containing monomer in a molar ratio of 4-7:2-4:1-3 in deionized water to obtain a monomer solution with a mass fraction of 20%-50%;
Step S2: adding a chain transfer agent accounting for 3%-20% of a total mass of the monomers into the monomer solution, stirring and dissolving at a speed of 200-300 r/min, and heating to 45° C. under the protection of inert gas in the stirring process;
Step S3: dripping a solution of an initiator in deionized water in a concentration of 10%-20% into the monomer solution with stirring, and reacting for 3-8 h at 50-70° C. after dripping within 30-50 min, wherein the initiator in the solution of the initiator in deionized water accounts for 0.05%-1.5% of a total mass of the monomers;

Step S4: distilling a reactant under reduced pressure at 30-80° C., cooling the reactant to room temperature, freezing, drying, and grinding into powder;

the phosphonic acid group-containing monomer is at least one of vinylphosphonic acid, dimethyl-vinyl phosphonate, diethyl-vinyl phosphonate, and 2-acrylamide-2-methylpropane phosphonic acid;

the rigid group-containing monomer is N-vinyl pyrrolidone or 4-acryloylmorpholine; and the carboxylic acid group-containing monomer is one of acrylic acid, maleic acid, methacrylic acid, and itaconic acid.

2. The composite additive for well cementing according to claim 1, wherein silicate in the silicate solution is one of sodium silicate and potassium silicate, and the silicate has a modulus of 1.2 to 2.5.

3. The composite additive for well cementing according to claim 1, wherein a preparation method of the silicate solution comprises the following steps: stirring silicate powder in deionized water at a temperature of 40-70° C. at a speed of 300-500 r/min for at least 2 h, and preparing to obtain the silicate solution with a mass fraction of 25%-45%.

4. The composite additive for well cementing according to claim 1, wherein a preparation method of the phosphonic acid polymer solution comprises the following steps: stirring phosphonic acid polymer powder in deionized water at room temperature at a speed of 300-500 r/min for at least 2 h, and preparing to obtain the phosphonic acid polymer solution with a mass fraction of 35%-60%.

5. The composite additive for well cementing according to claim 1, wherein the chain transfer agent is one or a combination of mercaptoethanol, isopropanol, triethylamine, n-butanol, and sodium bisulfite.

6. The composite additive for well cementing according to claim 1, wherein the initiator is one of ammonium persulfate, sodium persulfate, and potassium persulfate.

* * * * *